(12) United States Patent
Sherstyuk (10) Patent No.: US 11,831,186 B2
(45) Date of Patent: Nov. 28, 2023

(54) BALANCING A BATTERY PACK WITH PULSE CHARGING

(71) Applicant: GBatteries Energy Canada Inc., Ottawa (CA)

(72) Inventor: Mykola Sherstyuk, Ottawa (CA)

(73) Assignee: Gbatteries Energy Canada Inc., Ottawa (CA)

( * ) Notice: Subject to any disclaimer, the term of this patent is extended or adjusted under 35 U.S.C. 154(b) by 437 days.

(21) Appl. No.: 17/289,517

(22) PCT Filed: Oct. 29, 2019

(86) PCT No.: PCT/CA2019/051528
§ 371 (c)(1),
(2) Date: Apr. 28, 2021

(87) PCT Pub. No.: WO2020/087161
PCT Pub. Date: May 7, 2020

(65) Prior Publication Data
US 2021/0399554 A1    Dec. 23, 2021

Related U.S. Application Data

(60) Provisional application No. 62/754,842, filed on Nov. 2, 2018.

(51) Int. Cl.
*H02J 7/00* (2006.01)
*H01M 10/44* (2006.01)
*H01M 10/48* (2006.01)

(52) U.S. Cl.
CPC ......... *H02J 7/0019* (2013.01); *H01M 10/441* (2013.01); *H01M 10/443* (2013.01);
(Continued)

(58) Field of Classification Search
CPC ..................................... H02J 7/0014
(Continued)

(56) References Cited

U.S. PATENT DOCUMENTS 6,094,033 A    7/2000   Ding et al.
7,425,816 B2   9/2008   Meyer et al.
(Continued)

FOREIGN PATENT DOCUMENTS

WO    2005117231 A1    12/2005

OTHER PUBLICATIONS

Search Report and Search Opinion for related EP patent application No. 19879456.2 dated May 17, 2022.
(Continued)

*Primary Examiner* — Edward Tso
*Assistant Examiner* — Ahmed H Omar (57) ABSTRACT

Disclosed are systems, methods, and devices for balancing a battery pack that comprises a plurality of battery cells. A first charging protocol to charge the battery pack is employed, and while the battery pack is being charged, a determination is made whether the battery pack is imbalanced. After determining that the battery pack is imbalanced, a determination is made whether a value of the state of charge (SoC) of the battery pack corresponds to a particular range of values. After determining that the value of the SoC of the battery pack corresponds to the particular range of values and that the battery pack is imbalanced, a second charging protocol to charge the battery pack is employed, wherein the second charging protocol is different from the first charging protocol.

19 Claims, 7 Drawing Sheets

(52) U.S. Cl.
CPC ......... *H01M 10/48* (2013.01); *H01M 10/486* (2013.01); *H02J 7/0014* (2013.01); *H02J 7/0047* (2013.01); *H02J 7/0049* (2020.01); *H02J 7/00711* (2020.01); *H02J 7/00712* (2020.01); *H01M 2220/20* (2013.01)

(58) Field of Classification Search
USPC ........................................................ 320/116
See application file for complete search history.

(56) References Cited

U.S. PATENT DOCUMENTS

| | | |
|---|---|---|
| 10,069,313 B2 | 9/2018 | Tkachenko et al. |
| 10,122,187 B2 * | 11/2018 | Hwang ................. H02J 7/0019 |
| 10,135,281 B2 | 11/2018 | Tkachenko et al. |
| 2011/0127960 A1 * | 6/2011 | Plett ...................... H02J 7/0014 |
| | | 320/116 |
| 2017/0214253 A1 * | 7/2017 | Kim ...................... H02J 7/0018 |
| 2018/0131036 A1 | 5/2018 | Johnson et al. |
| 2018/0219390 A1 | 8/2018 | Tkachenko et al. |

OTHER PUBLICATIONS

International Search report for related application PCT/CA2019/051528 dated Apr. 2, 2020.

* cited by examiner

FIG. 7

BALANCING A BATTERY PACK WITH PULSE CHARGING

CROSS REFERENCE TO RELATED APPLICATIONS

This application claims priority to U.S. Provisional Patent Application No. 62/754,842, filed on Nov. 2, 2018, the content of which is incorporated herein by reference in its entirety for all purposes.

This application is related to commonly owned U.S. patent application Ser. No. 15/644,498, filed on Jul. 7, 2017, now U.S. patent Ser. No. 10/135,281, and U.S. patent application Ser. No. 15/939,018, filed on Mar. 28, 2018, now U.S. patent Ser. No. 10/069,313. U.S. patent application Ser. No. 15/644,498 and U.S. patent application Ser. No. 15/939,018 are incorporated herein in their entirety for all purposes.

TECHNICAL FIELD

Embodiments relate generally to battery pack management, and more particularly to methods and systems for balancing of a battery pack.

BACKGROUND

Battery Packs (e.g., multi-cell rechargeable batteries) are electrochemical energy storage systems that are used in numerous applications because of their high voltage delivery and their high charge storage capacity. Various such applications where battery packs are used include consumer electronics, e.g., laptops, personal digital assistants, cellular phones etc., automobiles, e.g., electric vehicles, hybrid vehicles etc., etc.

Even though the battery packs are convenient source of power, still the use of battery packs is limited to some applications due to charge capacity variation that may occur between battery cells of the battery pack. Simply stated, individual battery cells included in the battery pack have different charge capacities, which may be due to different cell compounds, different initial charge capacities (due to manufacturing variations) and other external effects. Over a series of charge-discharge cycles, the charge capacity of an individual battery cell can deviate further significantly from a charge capacity of other battery cells in the battery pack, and additionally, the voltage levels on the individual battery cells tend to become unbalanced over time, thus resulting in an imbalanced battery pack.

In an imbalanced battery pack, the charging and discharging limits are generally defined by the smallest capacity battery cell. For example, the charging of the whole battery pack has to stop as soon as one battery cell (e.g., smallest capacity battery cell) of the battery pack is fully charged, and similarly the whole battery pack is considered to be discharged as soon as one battery cell (e.g., smallest capacity battery cell) of the battery pack is completely discharged. Therefore, the full capacity of the battery pack is never utilized due to varying charge capacities of the battery cells of the battery pack. Shorter lifetime of the battery pack and reduced energy usage efficiency are some other adverse effects of imbalancing among battery cells of the battery pack.

Various cell balancing techniques, known in the art, are used to obviate the above mentioned problems. However, generally conventional cell balancing techniques require complicated control circuitry. For example, some cell balancing systems include multiple sensing circuits that monitor voltages in one or more cells of the battery pack. In some other conventional cell balancing systems, separate charging circuitry is provided to charge each battery cell individually. In other conventional approaches, cell balancing is achieved by selectively connecting battery cells of the battery packs to resistor(s) or metal-oxide-semiconductor field-effect transistors (MOSFETs) acting as resistor(s) to control delivery of charge to those cells by dissipating charge through resistors(s) or MOSFET(s).

Most of the conventional cell balancing systems require an auxiliary circuitry and/or a complex algorithm which significantly increase the cost, size, complexity, and other overheads associated with the battery pack or a charging system that charges the battery pack.

Embodiments were conceived in light of the above mentioned needs, problems and/or limitations, among other things.

SUMMARY

According to some implementations of the present disclosure, a method for a battery pack that comprises a plurality of battery cells is described. The method comprises employing a first charging protocol to charge the battery pack, while the battery pack is being charged, determining, based on at least one battery cell parameter of one or more battery cells of the battery pack, that the battery pack is imbalanced, after determining that the battery pack is imbalanced, determining a value of a state of charge (SoC) of the battery pack; determining whether the value of the SoC of the battery pack correspond to a particular range of values, and in response to determining that the value of the SoC of the battery pack correspond to the particular range of values and that the battery pack is imbalanced, employing a second charging protocol to charge the battery pack, wherein the first charging protocol is different from the second charging protocol.

In some implementations, employing the first charging protocol comprises employing a CC-CV charging protocol, a pulse charging protocol, a constant current protocol, a constant voltage protocol, a modulated pulse charging protocol, or a combination thereof, and employing the second charging protocol comprises applying charging pulses substantially simultaneously to at least two or more battery cells connected in series in the battery pack.

In some implementations, the method further comprises in response to determining that the value of the SoC of the battery pack does not correspond to the particular range of values, continuing charging the battery pack by employing the first charging protocol until the value of the SoC of the battery pack correspond to the particular range of values or until the battery pack is fully charged.

In some implementations, determining that the battery pack is imbalanced comprises determining a respective value of the at least one battery cell parameter of the one or more battery cells, and wherein the at least one battery cell parameter comprises one or more of: a cell voltage, a cell energy, a cell temperature, and a cell state of charge (SoC), and further determining that the value of the at least one battery cell parameter of at least one battery cell of the battery pack is less than a particular threshold value.

In some implementations, determining that the battery pack is imbalanced further comprises determining that a difference between the highest value of the at least one battery cell parameter and the lowest value of the at least one battery cell parameter, among the values of at the least one battery cell parameter for the one or more battery cells, is more than a particular threshold value.

In some implementations, employing the first charging protocol comprises charging the battery pack by applying first charging pulses to at least some battery cells of the battery pack, employing the second charging protocol comprises charging the battery pack by applying second charging pulses to the at least some battery cells of the battery pack, wherein the second charging pulses have an ON period duration that is shorter than an ON period duration of the first charging pulses, and wherein the ON period duration of the first charging pulses and the ON period duration of the second charging pulses are based on a rate of change of a charging current through the battery pack.

According to some implementations of the present disclosure, a battery pack is described. The battery pack comprises a plurality of battery cells, and a controller, operatively coupled to the plurality of battery cells, wherein the controller is configured to perform or control performance of operations that comprise employ a first charging protocol to charge the battery pack. While the battery pack is being charged, determine, based on at least one battery cell parameter of one or more battery cells of the battery pack, that the battery pack is imbalanced, after determining that the battery pack is imbalanced, determine a value of a state of charge (SoC) of the battery pack, determine whether the value of the SoC of the battery pack corresponds to a particular range of values; and in response to a determination that the value of the SoC of the battery pack corresponds to the particular range of values and that the battery pack is imbalanced, employ a second charging protocol to charge the battery pack, wherein the first charging protocol is different from the second charging protocol.

In some implementations, the operation to employ the first charging protocol comprises an operation to charge the battery pack by application of first charging pulses to at least some battery cells of the battery pack, the operation to employ the second charging protocol comprises an operation to charge the battery pack by application of second charging pulses to the at least some battery cells of the battery pack, the second charging pulses have an ON period duration that is shorter than an ON period duration of the first charging pulses, and wherein the ON period duration of the first charging pulses and the ON period duration of the second charging pulses are based on a rate of change of a charging current through the battery pack.

In some implementations, the operations further comprise in response to a determination that the value of the SoC of the battery pack does not correspond to the particular range of values, continue charging the battery pack by employing the first charging protocol until a determination is made that the value of the SoC of the battery pack correspond to the particular range of values or until the battery pack is fully charged.

In some implementations, an operation to employ the second charging protocol comprises an operation to apply charging pulses substantially simultaneously to at least two or more battery cells connected in series in the battery pack.

According to some implementations of the present disclosure, a charging device is described. The charging device comprises at least one processor; and a non-transitory computer readable storage medium, operatively coupled to the at least one processor, configured to store instructions, wherein the instructions, in response to execution by the at least one processor, cause the at least one processor to perform or control performance of operations that comprise: employ a first charging protocol to charge a battery pack that comprises a plurality of battery cells, while the battery pack is being charged, determine, based on at least one battery cell parameter of one or more cells of the battery pack, that the battery pack is imbalanced, after determining that the battery pack is imbalanced, determine a value of a state of charge (SoC) of the battery pack, determine whether the value of the SoC of the battery pack corresponds to a particular range of values; and in response to a determination that the value of the SoC of the battery pack corresponds to the particular range of values and that the battery pack is imbalanced, employ a second charging protocol to charge the battery pack, wherein the second charging protocol is different from the first charging protocol.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION OF THE DISCLOSURE

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprise," "includes," and/or "including," when used herein, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art to which this disclosure belongs.

Figure 1:
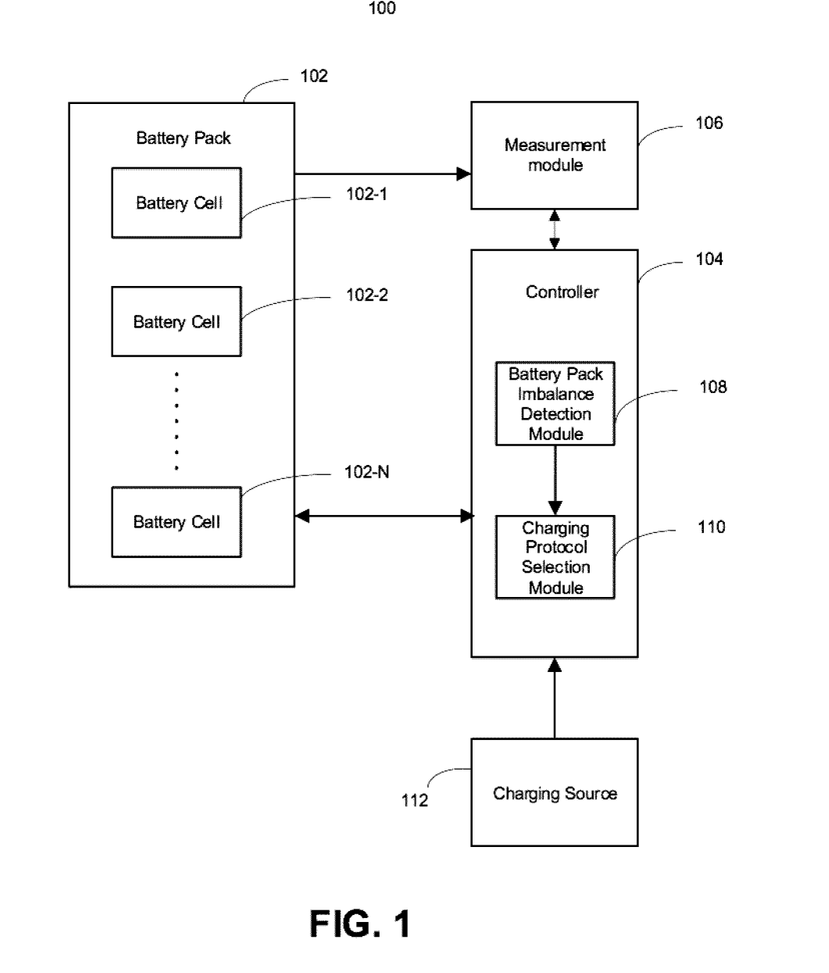
FIG. 1 shows a block diagram of an example battery system in accordance with some implementations of the present disclosure.
Figures 2A, 2B, 2C:
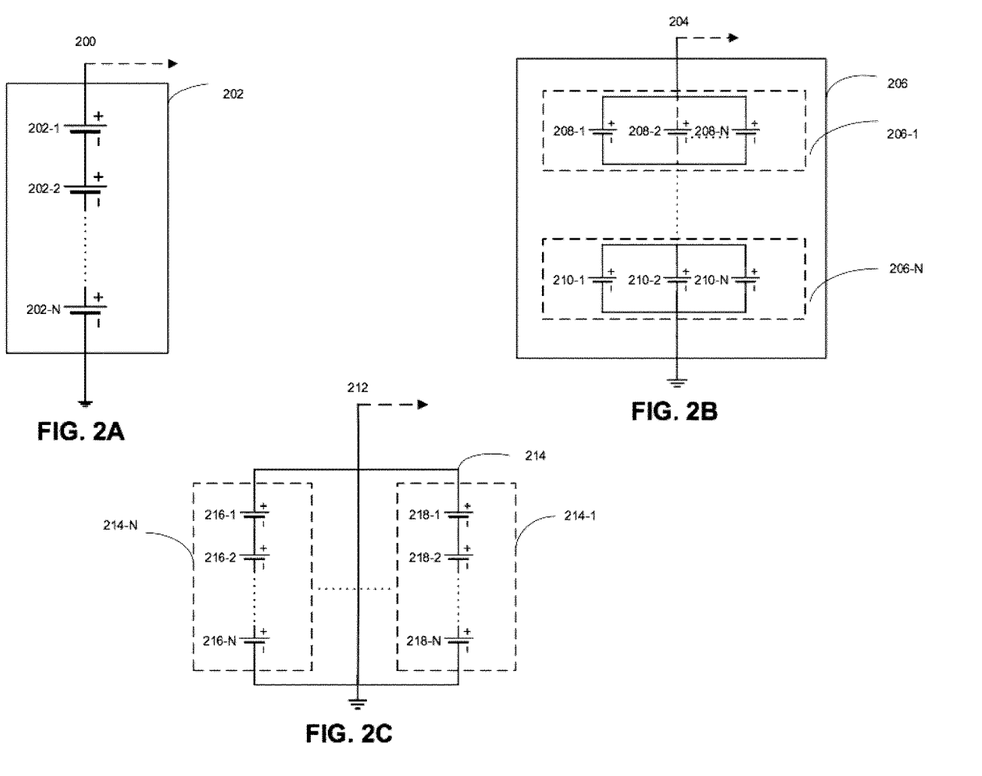
FIGS. 2A-2C illustrate example topologies of a battery pack in accordance with some implementations of the present disclosure.

FIG. 1 shows an example battery system 100 in accordance with some implementations of the present disclosure. The battery system 100 may include a battery pack 102 that may include a plurality of rechargeable battery cells 102-1, 102-2, 102-N. The battery cells 102-1, 102-2, 102-N inside the battery pack can be arranged in many configurations, e.g., series-connected battery cells, parallel-connected battery cells, or a combination of series-connected and parallel-connected battery cells. In some implementations, the battery pack 102 may include a plurality of battery modules connected to each other in series or parallel, each battery module may further include battery cells arranged in different series and parallel configurations. Various such example configurations for the battery pack 102 are illustrated in FIGS. 2A-2C.

In some implementations, the rechargeable battery cells 102-1, 102-2, 102-N may include, but not limited to, lithium ion battery cells, lithium metal battery cells, sodium ion battery cells, nickel cadmium battery cells, nickel metal hydride battery cells, lead acid battery cells, solid state battery cells etc. The systems, methods, and circuits described herein are not limited by the battery pack and/or battery cells types.

The battery system 100 may further include a controller 104, which is operatively coupled to a measurement module 106, a charging source 112, and a battery pack 102. The controller 104 may control charging and balancing of the battery pack 102 in accordance with some implementations. The controller 104 may include control logic (not shown in drawings) to control charging and balancing of the battery pack 102 in accordance with some implementations of the present disclosure. In some embodiments, the controller 110 can be a microcontroller and includes a central processing unit to process instructions and data, on-board memory to store instructions and data, a digital to analog converter for analog data conversion obtained from other modules of the battery system 100 (e.g., measurement module 106), and drive circuitry for control of the various modules of the battery system including, but not limited to, measurement module 106 and charging source 112.

In some implementations, the controller 104 may facilitate charging of the battery pack 102 by employing any of the charging protocols, including but not limited to, CC-CV charging protocol, a pulse charging protocol, a constant current protocol, a constant voltage protocol, a modulated pulse charging protocol, and a balancing-optimized pulse charging protocol. The modulated pulse charging protocol and the balancing-optimized pulse charging protocol are described later with reference to FIGS. 4-6.

In some implementations, the controller 104 may also measure monitor various parameters associated with the battery pack 102, and use the monitored parameters to manage operation of the battery pack 102. The various parameters monitored by the controller 104 may include, but not limited to, voltage, current, state of charge (SoC), temperature, and state of health. Additionally, the controller 104 may calculate various values, which include but not limited to charge current limit (CCL), discharge current limit (DCL), energy delivered since last charge or discharge cycle, internal impedance, and charge delivered or stored (coulomb counter) for the battery pack 102 as well as individual battery cells within the battery pack 102. The controller 104 may include a communication interface to communicate with the hardware within the battery pack 102, and with load associated with the battery pack 102, such as, but not limited to, a mobile phone, electric vehicle, laptop, personal assistant device, or any other device or system to which the battery pack 102 supplies power.

In some implementations, the controller 104 may operate as the battery management system (BMS) of the battery pack 102, and perform all such functions as performed by the BMS. The BMS is essentially "brain" of a battery and controls charging and discharging of the battery among other operations. The controller 104 may act as an active BMS that adapts charging and discharging of the battery pack 102 in real-time by monitoring real-time electrochemical and macrokinetic processes that occur within the battery pack 102, and/or battery cells comprised within the battery pack 102. The controller 104 may perform active BMS functions (e.g., control charging and discharging of the battery pack 102) as described in commonly owned U.S. patent application Ser. No. 15/644,498 and commonly owned U.S. patent application Ser. No. 15/939,018, the contents of which are incorporated herein in entirety for the reference.

The battery system 100 may further include a measurement module 106, which may include measurement circuitry (e.g., sensors and associated circuitry) to measure various parameters of the battery pack 102 and/or battery cells 102-1, 102-2, 102-N of the battery pack 102. Various parameters that may be measured by the measurement module 106 may include voltage, current, temperature, state-of-charge (SoC) etc., for the battery pack 102 as well as individual battery cells of the battery pack 102. Simply stated, the measurement module 106 may be configured to measure and determine values of various parameters (such as of current, voltage, temperature, SoC etc.) for the battery pack 102 as well as individual battery cells of the battery pack 102. The measurement module 106 may include various sensors, such as, but not limited to, ammeter, voltmeter, temperature sensor, coulomb counter etc. In some implementations, the measurement module 106 may also include some mechanical sensors such as, but not limited, to piezoelectric sensors (for determining battery swelling which is indicative of imbalance in the battery pack).

The battery system 100 may further include or be operatively coupled to a charging source 112, which may be, for example, a dedicated adaptor, such as AC-to-DC wall adapter. In most cases, such adaptors are designed with the specific battery charging needs in mind, and thus the source capabilities of the charging source allow for proper capacity-based charging current of batteries, such as battery pack 102. In some implementations, the charging source 112, can be, for example, a non-dedicated adaptor, such as a universal charger not necessarily designed with any specific battery capacity in mind. As another example, the charging source 112 may be a communication or computer bus voltage signal, intended to provide power to a number of devices connected in parallel or serially to the bus. One non-limiting example of this type of voltage source is a Universal Serial Bus (USB) connection, which provides a voltage bus (VBUS) signal from which a constrained amount of current may be drawn. Another example of the charging source 102 can be a USB-C connector, which is a 24-pin USB connector system, which is distinguished by its two-fold rotational-symmetrical connector. In some implementations, the charging source 112 may be a charging device for electric vehicles (e.g., charging station or an electric vehicle (EV) charger).

The controller 104 may include a battery pack imbalance detection (BPID) module 108 and a charging protocol selection (CPS) module 110, among many modules, which may interoperate to control charging/discharging and balancing of the battery pack 102 in accordance with some implementations of the present disclosure.

The BPID module 108 of the controller 104 may obtain measurements corresponding to the battery pack 102 and battery cells 102-1, 102-2, 102-N of the battery pack 102. Based on the obtained measurements, the BPID module 108 may determine that the battery pack 102 is imbalanced.

In some implementations, the BPID module 108 may determine that the battery pack 102 is imbalanced while the battery pack is being charged.

In some implementations, the BPID module 108 may obtain respective values of cell parameter(s), e.g., cell voltage, cell energy, cell SoC, cell temperature etc., corresponding to one or more battery cells of the battery pack 102 from the measurement module 106. Based on the obtained values, the BPID module 108 may determine that the battery pack 102 is imbalanced.

In some implementations, the BPID module 108 may compare the respective values of the cell parameter with a particular threshold value and determine that the value of the cell parameter (e.g., cell voltage, cell SOC, cell capacity, cell impedance) for at least one battery cell is less or higher than the particular threshold value. Based on the determination that the value of the cell parameter of the at least one battery cell is different than the particular threshold value (e.g., difference between the parameter value and threshold value is out of a particular range), the BPID module 108 may determine that the battery pack 102 is imbalanced.

In some implementations, the BPID module 108 may compute a difference between the respective values (e.g., cell voltage values or cell SOC values) of the cell parameter for the one or more battery cells of the battery pack 102 and may determine that the battery pack 102 is imbalanced based on the difference values. For example, the BPID module 108 may determine that a difference between the highest value (e.g., corresponding to cell 1) of the battery cell parameter and the lowest value (e.g., corresponding to cell 2) of the battery cell parameter, among the values of at the cell parameter for the one or more battery cells, is more than a particular threshold value. In response to such determination, the BPID module 108 may determine that the battery pack 102 is imbalanced. The various cell parameters whose values may be determined and compared by the BPID module 108 may include cell voltage, cell SOC, cell impedance, cell coulombic efficiency, and cell capacity. For example, the BPID module 108 may determine that the battery pack 102 is imbalanced if there is imbalance (or variation) in one or more of the following cell parameters: cell voltage, cell SOC, cell impedance, cell coulombic efficiency, and cell capacity for different cells of the battery pack 102.

The CPS module 110 of the controller 104 may facilitate charging of the battery pack 102 by obtaining power from the charging source 112 and employing any of the charging protocols, including, but not limited to, CC-CV charging protocol, a pulse charging protocol, a constant current protocol, a constant voltage protocol, a frequency modulated pulse charging protocol, a balancing-optimized pulse charging protocol (described later with reference to FIGS. 4-6) to charge the battery pack 102.

In the CC-CV charging protocol, the CPS module 110 may provide constant charging current (e.g., lower than the maximum charging current for the battery pack 102) to the battery pack 102 until the voltage of the battery pack 102 becomes constant (e.g., reaches maximum charging voltage specified for the battery pack 102). When the voltage of the battery pack 102 becomes constant, the charging current is reduced until the battery pack 102 becomes fully charged.

In the constant current protocol, the CPS module 110 may provide uniform charging current to the battery pack 102 regardless of the state of charge (SoC) or temperature of the battery pack 102.

In the constant voltage protocol, the CPS module 110 may apply nearly the same voltage input to the battery pack 102 throughout the charging process, regardless of the SoC of the battery pack 102. In constant voltage protocol, higher initial current is employed to the battery pack 102 in the beginning of the charging cycle because of the greater potential difference between the battery pack 102 and the charging source 112.

In the pulse charging protocol, the CPS module 110 may feed charging current to the battery pack 102 in charging pulses. In some implementations, the CPS module 110 may select pulse parameters of charging pulses applied to the battery pack 102 based on various battery pack parameters, such as, but not limited to, voltage, temperature, SoC, etc. In some implementations, the CPS module 110 may apply short discharge pulse(s) following the sequences of charging pulses (e.g., during the rest period).

The CPS module 110 also employ frequency modulated pulse charging protocol and/or balancing-optimized pulse charging protocol to charge the battery pack. The frequency modulated pulse charging protocol and the balancing-optimized pulse charging protocol are discussed later with reference to FIGS. 4-6.

In some implementations, while the battery pack 102 is being charged (based on the first charging protocol), the CPS module 110 may obtain an indication of that the battery pack 102 is imbalanced from the BPID module 108. The first charging protocol may include any of the, but not limited to, CC-CV charging protocol, a pulse charging protocol, a constant current protocol, a constant voltage protocol, a frequency modulated pulse charging protocol. In response to determining that the battery pack 102 is imbalanced, the CPS module 108 may determine a value of a state of charge (SoC) of the battery pack 102. The CPS module 110 may obtain the value of the SoC of the battery pack 102 from the measurement module 106. Further, the CPS module 110 may determine whether the value of the SoC of the battery pack 102 corresponds to a particular range of values. For example, the particular range of values may be 30%-40% SoC (i.e., if the battery pack is 30%-40% charged). In another example, the particular range of values can be 20%-70% SoC (i.e., if the battery pack is 20%-70% charged). These SoC range values are exemplary and may vary for different batteries.

In response to determining that the value of the SoC of the battery pack 102 correspond to the particular range of values (i.e., if the SoC value of the battery pack falls in the particular range) and that the battery pack is imbalanced, the CPS module 110 switches to the second charging protocol to charge the battery pack.

In some implementations, the second charging protocol is a balancing-optimized pulse charging protocol in which pulses of very short duration (e.g., having ON duration in the range of 200 nanoseconds-800 nanoseconds) are applied to the battery pack 102 to charge the battery pack. The balancing-optimized pulse charging protocol is discussed in detail later with reference to FIGS. 4-6.

It is appreciated that a person of ordinary skill in the art may vary implementation of the battery system 100 and such variations are within the scope of the present disclosure. For example, the controller 104 and/or the measurement module 106 can be implemented as a component of the charging source 112. In such implementations, the controller 104 and/or the measurement module 106 may be housed in a housing of the charging source 112. Similarly, the controller 104 and/or the measurement module 106 can be implemented as a component of the battery pack 102. In such implementations, the controller 104 and/or the measurement module 106 may be housed in a housing of the battery pack 102. In another example, the controller 104 can be configured to provide the capabilities of the measurement module 106. Simply stated, the controller 104 may be configured with the functionalities of the measurement module 106.

FIGS. 2A-2C illustrate example topologies of a battery pack which can be adopted by a battery pack 102 (described with reference 102) in accordance with some implementations of the present disclosure.

FIG. 2A depicts an example topology 200 of a battery pack 202 which includes a plurality of battery cells 202-1, 202-2, 202-N connected in series with each other. The battery pack 102 described with reference to FIG. 1 may adopt a similar topology as the battery pack 202.

FIG. 2B depicts an example topology 204 of a battery pack 206 which includes a plurality of battery modules 206-1, 206-N connected in series with each other. Each battery module of the battery pack 206 may include a plurality of series connected battery cells, parallel-connected battery cells, or combination of series-connected and parallel-connected battery cells. The configuration of battery cells (e.g., series and/or parallel connections) in each battery module can be same as well as different. As can be seen in FIG. 2B, the battery module 206-1 includes parallel-connected battery cells 208-1, 208-2, 208-N. Similarly, the battery module 206-N includes parallel connected battery cells 210-1, 210-2, 210-N. The battery pack 102 described with reference to FIG. 1 may adopt a similar topology as the battery pack 206.

FIG. 2C depicts an example topology 212 of a battery pack 214 which includes a plurality of battery modules 214-1, 214-N connected in parallel to each other. Each battery module of the battery pack 214 may include a plurality of series connected battery cells, parallel-connected battery cells, or combination of series-connected and parallel-connected battery cells. The configuration of battery cells (e.g., series and/or parallel connections) in each battery module can be same as well as different. As can be seen in FIG. 2B, the battery module 214-1 includes series-connected battery cells 218-1, 218-2, 218-N. Similarly, the battery module 214-N includes series connected battery cells 216-1, 216-2, 216-N. The battery pack 102 described with reference to FIG. 1 may adopt a similar topology as the battery pack 214. The number of battery cells and number of modules in each of the configurations shown in FIGS. 2A-2C is dynamic and can be selected based on various parameters, for example, based on load requirements (e.g., desired output power).

Figure 3A:
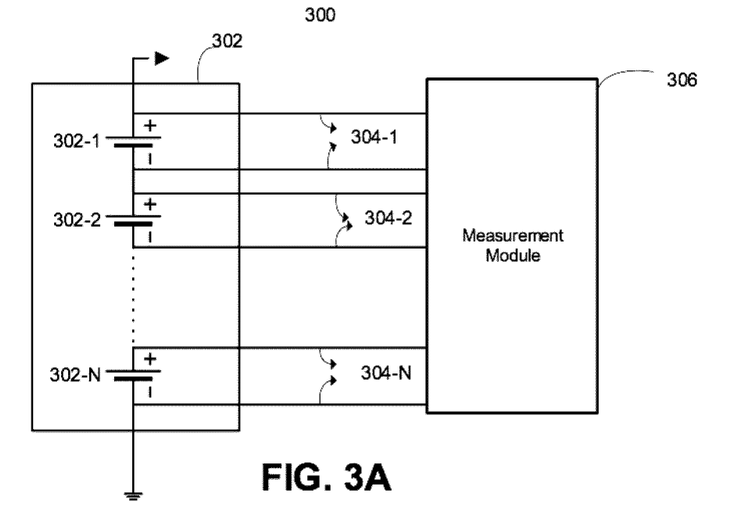
FIGS. 3A and 3B illustrate example implementations of battery measurements in accordance with some implementations of the present disclosure.
Figure 3B:
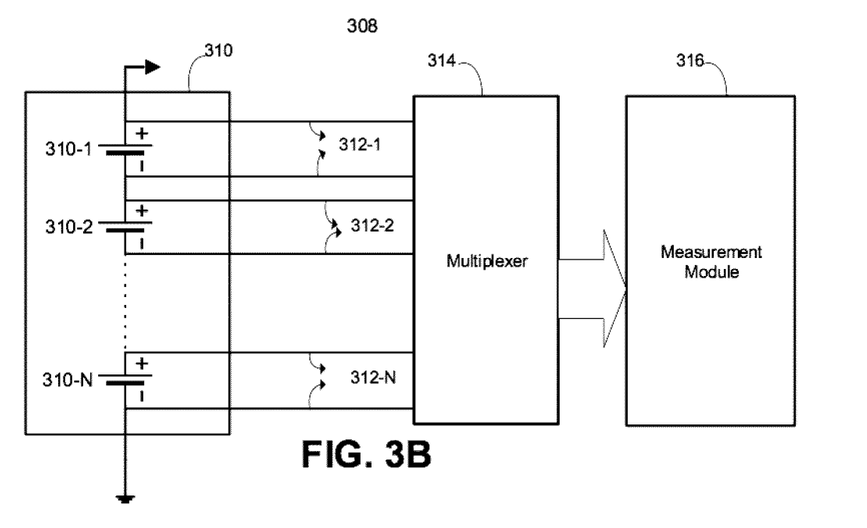

FIGS. 3A and 3B illustrate example implementations of battery measurements in accordance with some implementations of the present disclosure.

In FIG. 3A, an example implementation 300 for battery pack measurements is illustrated. As can be seen in FIG. 3A, the battery pack 302 includes a plurality of battery cells 302-1, 302-2, 302-N. Each battery cell has its own pair of measurement channels feeding into the measurement module 306. The battery cell 302-1 has a pair of measurement channels 304-1 that communicatively couple the battery cell 302-1 to the measurement module 306. Similarly, the battery cells, 302-2 and 302-N have a respective pair of measurement channels 304-2, 304-N that communicatively couple the battery cells 302-2, 302-N to the measurement module 306. The measurement module 306 may be similar to measurement module 106 (described with reference to FIG. 1) and may obtain measurement such as voltage, current, temperature, SoC etc., for each of the battery cells 302-1, 302-2, 302-N by using the measurement channels 304-1, 304-2, 304-N. The battery cells 302-1, 302-2, 302-N can be arranged in any configuration as depicted in FIGS. 2A-2C.

FIG. 3B illustrates another example implementation 308 for battery pack measurements. As can be seen in FIG. 3B, the battery pack 310 includes a plurality of battery cells 310-1, 310-2, 310-N. Each battery cell has its own pair of measurement channels feeding into the multiplexer 314 which feeds into the measurement module 316. For example, the battery cell 310-1 has a pair of measurement channels 312-1 that communicatively couple the battery cell 302-1 to the multiplexer 314 and with the measurement module 316 (through the multiplexer 314). Similarly, the battery cells, 310-2 and 310-N have a respective pair of measurement channels 312-2, 312-N that communicatively couple the battery cells 310-2, 310-N to the multiplexer 314 and measurement module 316 (through the multiplexer 314). The measurement module 316 may be similar to measurement module 106 (described with reference to FIG. 1) and may obtain measurement such as voltage, current, temperature, SoC etc., for each of the battery cells 310-1, 310-2, 310-N by using the measurement channels 312-1, 312-2, 312-N and the multiplexer 314. The multiplexer 314 may multiplex various measurement signals corresponding to the battery cells 310-1, 310-2, 310-N and feed them as a bundle of measurement signals to the measurement module 316. The battery cells 310-1, 310-2, 310-N can be arranged in any configuration as depicted in FIGS. 2A-2C.

Figure 4:
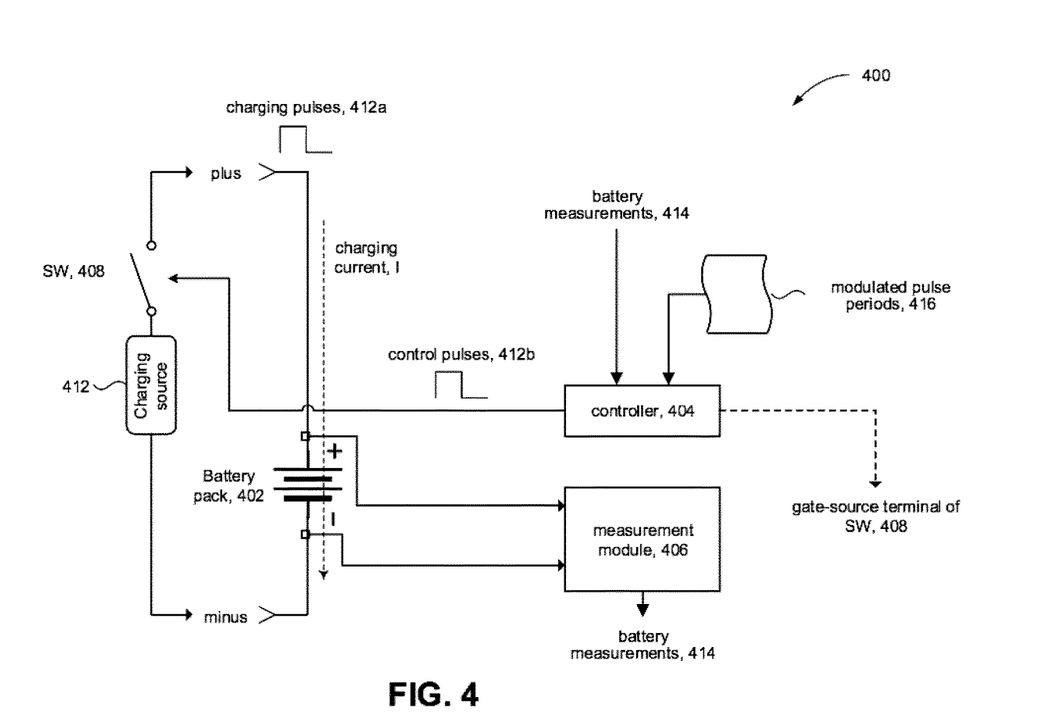
FIG. 4 illustrates an example battery charging circuit in accordance with some implementations of the present disclosure.

FIG. 4 illustrates an example battery charging system in accordance with some implementations of the present disclosure.

As stated above with reference to FIG. 1, the BPS module 108 of the controller 104 may employ any of the charging protocols, including, but not limited to, CC-CV charging protocol, a pulse charging protocol, a constant current protocol, a constant voltage protocol, a frequency modulated pulse charging protocol, a balancing-optimized pulse charging protocol (described later with reference to FIGS. 4-6) to charge the battery pack 102. FIG. 4 illustrates an example battery system 400 that illustrate implementation details to charge the battery pack 402 by employing various charging protocols. The battery charging system 400 includes a battery pack 402 (e.g., battery pack 102 described with reference to FIG. 1), a controller 404 (e.g., a controller 104 described with reference to FIG. 1), a measurement module 406 (e.g., a measurement module 106 described with reference to FIG. 1), and a charging source 412 (e.g., a charging source 112 described with reference to FIG. 1).

The battery system 400 may further include a switch 408 that can be controlled (ON, OFF) to provide a charging current I from the charging source 412 to the battery pack 402 in bursts, e.g., charging pulses 412a of energy. In some implementations, for example, the switch 408 can be a field effect transistor (FET) device.

In some implementations, for example, to employ the modulated pulse charging protocol and the balancing-optimized pulse charging protocol, the controller 404 can be configured to generate control pulses 412b that are provided to the switch 408 to control operation of the switch to produce the charging pulses 412a based on the power from the charging source 412. The controller 404 can modulate the frequency (e.g., pulse period) of the control pulses 412b (and thus charging pulses 412a). For example, the controller 404 can control the duration of the ON period and the OFF period of each control pulse 412b (and thus each charging pulse 412a).

In some implementations, the controller 404 can use a lookup table (not shown in the FIG. 4) that defines a set of modulated pulse periods, e.g., for the modulated pulse charging protocol and the balancing-optimized pulse charging protocol. In some implementations, the controller 404 can modulate the pulse periods of the control pulses 412b by computing the pulse periods on the fly; e.g., using a mathematical function. The amplitudes of the control pulses 412b are logic levels, and can vary between logic LO (e.g., $V_{SS}$, such a ground potential) to logic HI (e.g. $V_{DD}$ such as 5V).

The battery charging system 400 can further include a measurement module 406 which can be similar to measurement module 106 described with reference to FIG. 1. In accordance with some implementations of the present disclosure, battery measurements 414 produced by the measurement module 406 can be provided to the controller 404. The controller 404 can be configured to generate control pulses 412b (and thus charging pulses 412a) that are further based on the battery measurements 414.

Figure 5:
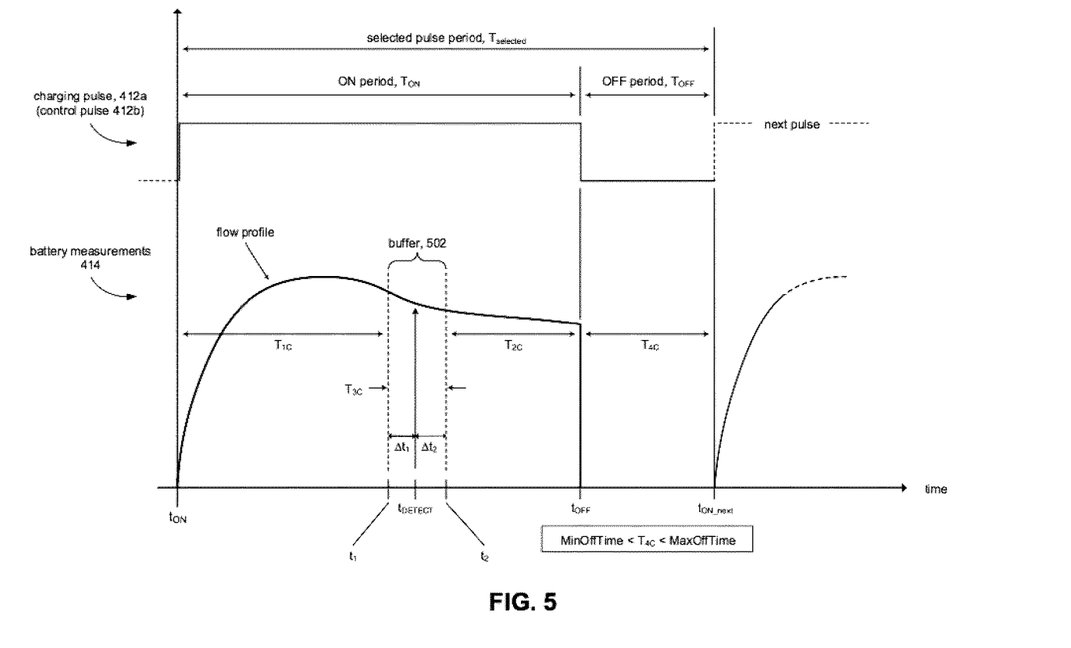
FIG. 5 illustrates details for determining pulse parameters of a charging pulse in accordance with some implementations of the present disclosure.

FIG. 5 illustrates details for determining pulse parameters (e.g., duty cycle, $T_{ON}$, $T_{OFF}$ etc.) of a charging pulse applied to the battery pack 402 in modulated pulse charging protocol by the controller 404 to charge the battery pack 402 in accordance with some implementations of the present disclosure.

The controller 404 may use the battery measurements 414 taken during the time of a charging pulse 412a to determine its duty cycle. Assume for discussion purposes the selected pulse period for charging pulse 412a is $T_{selected}$; e.g., selected from a modulated waveform at a time $t_{ON}$. The charging pulse 412a has an ON period ($T_{ON}$) and an OFF period ($T_{OFF}$). The duration of $T_{ON}$ and $T_{OFF}$ can be dynamically determined based on battery measurements 414 made during the ON period of the charging pulse 412a.

The battery measurements 414 can comprise measurements of current flow through the battery pack 402. Current flow through the battery pack 402 can gradually increase from the time $t_{ON}$ that the charging pulse 412a is applied and follow the flow profile such as shown in FIG. 5. The flow profile of current through the battery pack 402 depends on factors such as battery chemistry, state of charge, temperature, and the like. In a lithium ion battery, for example, the lithium ions flow from the positive electrode to the negative electrode through the electrolyte. The electrons and lithium ions combine at the negative electrode and deposit there. During a charging pulse, the charge current saturation can occur where additional charge current into the battery pack 402 for that charging pulse 412a may not be effective and may even be detrimental (e.g., cause heat build up, create mechanical stress).

In accordance with the present disclosure, the controller 404 can analyze or otherwise track the current flow to detect the onset charge current saturation by looking for a change in the flow profile. Suppose at time $t_{DETECT}$ the controller 404 detects such a change in the flow profile. The time of detection $t_{DETECT}$ can be used to determine the duration $T_{ON}$ of the ON period of the charging pulse 412a, for example, in order to limit the charge current into the battery pack 402. A first time period $T_{1C}$ between $t_{ON}$ and $t_{DETECT}$ can be computed by backing off a margin of time $\Delta t_1$ from $t_{DETECT}$, for example, by computing $t1 = t_{DETECT} - \Delta t_1$. A buffer 502 comprising the margin of time $\Delta t_1$ and $\Delta t_2$ can be provide around the detection time $t_{DETECT}$ to account for uncertainty in the detection of the onset of charge saturation. The first period $T_{1C}$ can be the period between time $t_{ON}$ and time $t_1$.

A second time period $T_{2C}$ can be computed based on keeping the second time period within a predetermined range. During the second time period $T_{2C}$, charge saturation can be a dominant factor during the charging pulse. In some embodiments, the second time period $T_{2C}$ can be determined in order to maintain a certain ratio R between $T_{1C}$ and $T_{2C}$. For example, $T_{2C}$ can be computed from the relation: $R = T_{1C}/T_{2C}$, where R can be a predetermined ratio. The ON period $T_{ON}$ can be computed as $T_{ON} = (T_{1C} + T_{2C} + T_{3C})$, where T3C is the width of the buffer 502. By dynamically computing the ON period for each charging pulse 412a, battery charging can be more efficient, battery damage that inherently arises during charging (e.g., heat buildup) can be reduced (which can contribute to safety), and battery life can be extended.

In accordance with the present disclosure, the OFF period $T_{OFF}$ of the charging pulse 412a can be computed by subtracting the $T_{ON}$ from the selected pulse period $T_{selected}$. However, if the resulting OFF period is too long, then overall battery charging time can be increased, which is typically undesirable. Accordingly, in accordance with the present disclosure if the $T_{OFF}$ exceeds a predetermined maximum time MaxOffTime, $T_{OFF}$ can be set to MaxOffTime. As a consequence, the actual pulse period of the charging pulse 412a will be different from the selected pulse period $T_{selected}$.

If, on the other hand, the resulting OFF period is too short, then there may not be enough recovery time for various chemical reactions in the battery pack 402 to run their course before the onset of the next charging pulse; more time may be needed. Accordingly, in accordance with the present disclosure, if the $T_{OFF}$ becomes less than a predetermined minimum time MinOffTime, $T_{OFF}$ can be set to MinOffTime to allow time for the chemical reactions to take place before initiating the next charging pulse. As a consequence, the actual pulse period of the charging pulse 412a will be different from the selected pulse period $T_{selected}$.

The amplitude of the charging current I (FIG. 4) of the charging pulse can vary from one charging pulse to the next, during the charging process. he inventors of the present disclosure have noted that the OFF period of one charging pulse can affect the charging current amplitude. Accordingly, in some embodiments, rather than basing the OFF period on the selected pulse period $T_{selected}$, the OFF period can be varied between MinOffTime and MaxOffTime in response to the amplitude of the charging current I.

In some implementations, the output voltage of the charging source 412 can be selected for different charging pulses 412a. A reason for doing this is to limit the "headroom" for the current of the charging pulse 412a. The battery impedance can be a highly dynamic parameter whose value can change very quickly. It can be impractical, and in some cases may not be feasible, to use a conventional feedback loop to control the charging current to accommodate for a changing battery impedance. In accordance with some aspects of the present disclosure, the output voltage of the charging source 412 can be adjusted to limit its output level so that the current flow (i.e., charging current I, FIG. 4) into the battery pack 402 does not exceed safety levels. For example, suppose the safety limit sets a peak charging current of the battery pack 402 to be 35 A. If we expect the battery pack 402 to have a minimum battery impedance of 100 mΩ and an open circuit voltage (OCV) of 3.5 V, this establishes a 7V output voltage for the charging source 412:

$$3.5V+35A\times0.1\Omega=7V.$$

In other implementations, instead of limiting the output voltage of the charging source 412, the switch 408 can be used to limit the flow of charging current I into battery pack 402. Referring to FIG. 4, for example, the controller 404 can produce an analog output to adjust the gate-source voltage of switch 408 and hence the device channel saturation of the switch 408, to control the charging current I.

In some implementations, for example, the flow profile of the charging current I flowing through the battery pack 402 may include a exponential decay portion and a linear decay portion. The slope of the flow profile can be monitored to detect the transition between the exponential decay portion and the linear decay portion. For example, the slope can be monitored at the onset of the charging pulse at time $T_{ON}$. In some embodiments, the monitoring can begin at some time after $T_{ON}$, since saturation does not happen right away. In some implementations, the rate of change of the slope (i.e., second derivative of the flow profile) can be used to determine when the change in the current flow through the battery pack 402 has occurred. In other embodiments, the rate of change of the rate of change (i.e., a third derivative) of the charging current can be determined. In particular, a change in the sign of the third derivative can be detected. The rate of change of current through the battery pack 402 (e.g., second derivate of the flow profile) can be monitored by the controller 404 (e.g., through measurement module 406) to determine $T_{ON}$ of the charging pulses 412a. For example, when the rate of change of charging current I through the battery pack 402 (during the charging pulse 412a) is approaching zero or close to zero, the controller 404 may change the state of the switching element to OPEN position to disconnect the charging source 412 from the battery pack 402, thus defining $T_{ON}$ of the control pulse 412b (and charging pulse 412a). As stated above, the OFF period ($T_{OFF}$) can be varied between MinOffTime and MaxOffTime.

In the balancing-optimized pulse charging protocol, the controller 404 determines ON time period $T_{ON}$ of the charging pulses 412a to charge the battery pack 402 similarly to the determination done for the modulated pulse charging protocol, i.e., based on the charging current flow profile and/or the rate of change of charging current. The determined $T_{ON}$ for the charging pulses is then reduced or increased by a predetermined factor. The predetermined factor is based on a state of charge (SoC) of the battery pack 402, the age of the battery pack 402, the type of the battery pack 402, the chemistry of the battery pack 402, and/or desired charging time for the battery pack 402 etc. The controller 404 may be configured to calculate the $T_{ON}$ for the charging pulses for the balancing-optimized pulse charging protocol based on the above factors and applies the charging pulses with the adapted (e.g., reduced) $T_{ON}$ in the balancing-optimized pulse charging protocol. Simply stated, the $T_{ON}$ of the charging pulses to be applied to the battery pack 402 while the balancing-optimized pulse charging protocol is employed to charge the battery pack 402 is based on the $T_{ON}$ of the charging pulses of the modulated pulse charging protocol and a number of other factors such as the state of charge (SoC) of the battery pack 402, the age of the battery pack 402, the type of the battery pack 402, the chemistry of the battery pack 402, and/or desired charging time for the battery pack 402 etc.

Hence, in some implementations, employing the balancing-optimized pulse charging protocol includes applying to the battery pack (e.g., battery pack 102, 402) charging pulses having a shorter ON duration as compared to ON duration of charging pulses applied in the modulated pulse charging protocol. The controller 404 may determine the $T_{ON}$ of the balancing-optimized charging pulses during rest period between the charging pulses. In some implementations, the controller 404 may determine the $T_{ON}$ of the balancing-optimized charging pulses periodically while the battery pack 402 is being charged with the balancing-optimized charging pulses. In some implementations, employing the balancing-optimized pulse charging protocol comprises applying charging pulses having determined $T_{ON}$ (which is shorter than $T_{ON}$ of pulses of modulated pulse charging protocol) substantially simultaneously to at least two or more battery cells connected in series in the battery pack (e.g., battery pack 102, 402). In some implementations, employing the balancing-optimized pulse charging protocol comprises applying charging pulses having determined $T_{ON}$ (which is greater than $T_{ON}$ of pulses of modulated pulse charging protocol) substantially simultaneously to at least two or more battery cells connected in series in the battery pack (e.g., battery pack 102, 402).

In some implementations, the ON time duration of very short charging pulses for the balancing-optimized pulse charging protocol may be 1 microsecond with duty cycle 10%.

In some implementations, a look-up table that stores values of various pulse parameters for charging pulses (e.g., mapped to battery pack SoC values) to be applied during the modulated pulse charging protocol and/or charging-optimized pulse charging protocol may be build, for example, during battery characterization and training. Such a look-up table may be employed by the controller 104 to charge the battery pack 102 in accordance with the present disclosure.

In some implementations, the balancing-optimized pulse charging protocol is applied to charge the battery pack, only when the battery pack SoC is within the particular range of values (e.g., 30-40% SoC). When the SoC of the battery pack does not lie in the particular range (e.g., SoC of the battery pack is less than 30%, and/or when SoC of the battery pack is detected to be more than 40%), other charging protocols may be employed to charge the battery pack.

In some implementations, the balancing-optimized pulse charging protocol may be used to train (pre-use) the battery cells. For example, the battery pack may be charged with the balancing-optimized pulse charging protocol, when the SoC of the battery pack is in the particular range (e.g., 30%-

40%), and then the battery pack is discharged after the SoC of the battery pack reaches the upper limit of the SoC. The battery pack may be discharged to the lower limit of the SoC (e.g., 30% SoC) range using any protocol, and subsequently the balancing-optimized pulse charging protocol may be employed in the particular range of SoC value to charge the battery pack again till the battery pack is charged to the upper limit of the SoC (e.g., 40% SoC), followed by discharging and charging again for a number of cycles. The cycling of the battery pack in such a manner may continue for a particular number of cycles. Such cycling (e.g., using the balancing-optimized pulse charging protocol) is shown to result in balanced battery cells.

Figure 6:
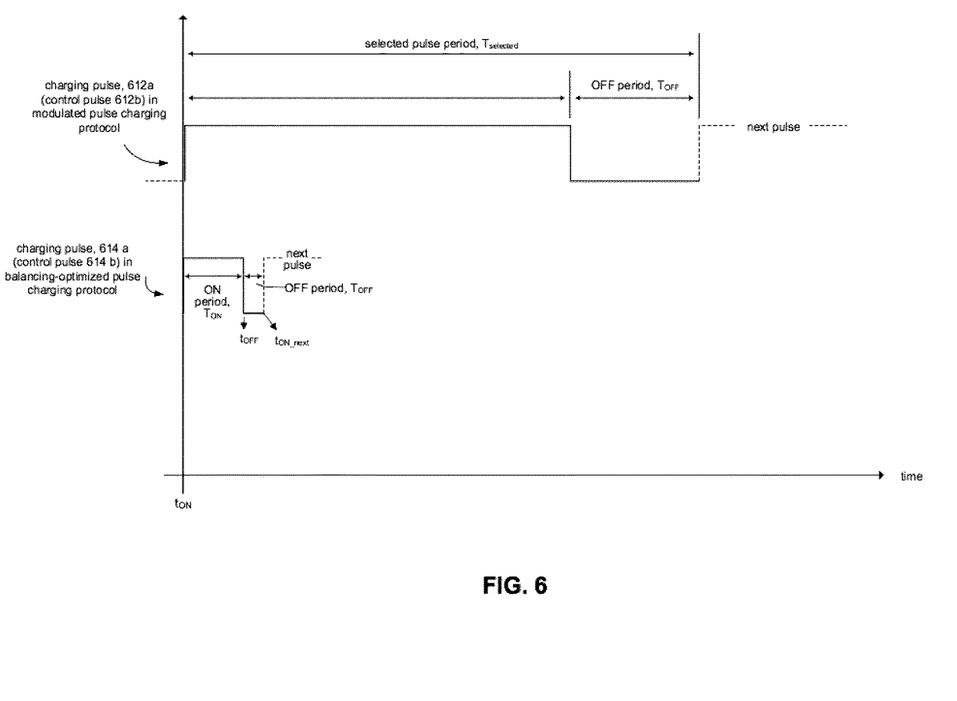
FIG. 6 illustrates pulse parameters of a charging pulse of balancing-optimized pulse charging protocol in accordance with some implementations of the present disclosure.

As depicted in FIG. 6, the ON time duration of the charging pulses 612a (and control pulses 612b that controls the switch associated with the battery pack) applied to the battery pack (e.g., battery pack 402) in the modulated pulse charging protocol is longer than the ON time duration of the charging pulses 614a (and control pulses 614b that controls the switch associated with the battery pack) applied to the battery pack (e.g., battery pack 402) in the balancing-optimized pulse charging protocol. The other pulse parameters of modulated pulses and balancing-optimized pulses can be same or different.

Figure 7:
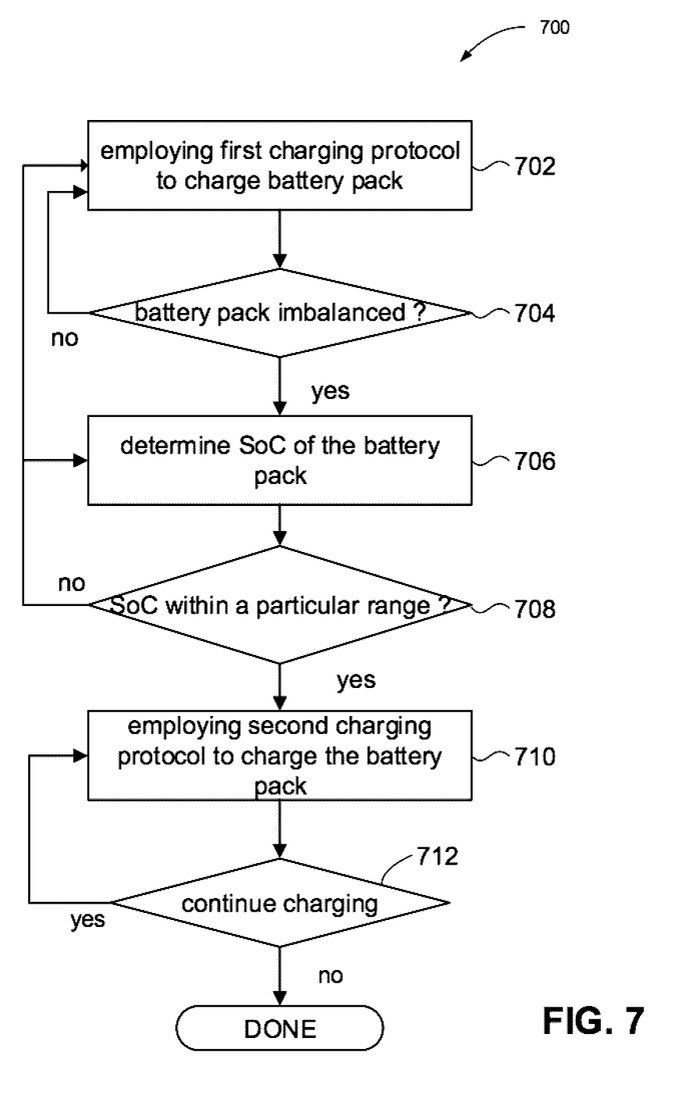
FIG. 7 is a flowchart illustrating an example method to balance a battery pack in accordance with some implementations of the present disclosure.

FIG. 7 is a flowchart illustrating an example method to balance a battery pack while charging the battery pack in accordance with some implementations of the present disclosure.

The method 700 begins at block 702, where a first charging protocol is employed to charge the battery pack (e.g., battery pack 102 described with reference to FIG. 1). For example, the controller 104 (described with reference to FIG. 1) may obtain power from a charging source 112 (described with reference to FIG. 1) and employ at least one of: CC-CV charging protocol, a pulse charging protocol, a constant current protocol, a constant voltage protocol, and/or a modulated pulse charging protocol as the first charging protocol to charge the battery pack 102.

At block 704, while the battery pack is being charged, a determination is made whether the battery pack, e.g., battery pack 102 is imbalanced. For example, the controller 104 may determine respective values of at least one cell parameter, corresponding to one or more battery cells of the battery pack 102, and based on the determined respective values of the cell parameter(s), the controller 104 may determine whether the battery pack 102 is imbalanced.

If it is determined that the battery pack is imbalanced, at block 706, a value of a state of charge (SoC) of the battery pack is determined. For example, the controller 104 may obtain the value of SoC of the battery pack 102 from the measurement module 106 (described with reference to FIG. 1). If it is determined that the battery pack is not imbalanced, the processing continues to 702.

At block 708, it is determined whether the value of the SoC of the battery pack lies in a particular range of values. For example, the controller 104 may make a determination whether the value of SoC of the battery pack lies in a particular range of values e.g., 30%-40% SoC. The determination of the SoC of the battery pack may be performed continually or periodically, and the charging protocol to charge the battery pack may be switched based on the SoC of the battery pack.

After determining that the value of SoC of the battery pack lies in the particular range of values and that the battery pack is imbalanced, at block 710, a second charging protocol is employed to charge the battery pack. For example, after determining that the value of SoC of the battery pack 102 lies in the particular range of values, and after determining that the battery pack 102 is imbalanced, the controller 104 may employ the second charging protocol, e.g., balancing-optimized pulse charging protocol to charge the battery pack 102.

If it is determined that the value of SoC of the battery pack does not lie in a particular range of values, then the processing continues to block 702. In some implementations, the operation 706 of determining the value of SoC of the battery pack is performed periodically until a determination is made that the value of SoC of the battery pack lies in the particular range of values.

At block 712, it is determined if the charging of the battery pack should continue or not. If it is determined that the charging of the battery pack 102 should continue, the battery pack 102 is charged by employing the second charging protocol till the SoC of the battery pack 102 lies in the particular range of values.

In some implementations, the balancing-optimized pulse charging protocol is applied to charge the battery pack 102, only when the SoC of battery pack 102 is within the particular range of values (e.g., 30-40% SoC). When the SoC of the battery pack 102 is measured and it is determined that it does not lie in the particular range (e.g., SoC of the battery pack is less than 30%, and/or when SoC of the battery pack is detected to be more than 40%), other charging protocols (e.g., first charging protocol) may be employed to charge the battery pack. If the battery is being cycled, then the battery pack 102 may be discharged till the SoC of the battery pack 102 reaches the lower limit of the SoC range, followed by charging of the battery pack, by employing the balancing-optimized pulse charging protocol, till the SoC of the battery pack 102 reaches the upper limit of the SoC. Such charging and discharging of the battery pack 102 within the particular SoC range may continue for a number of cycles based upon cycling related parameters (e.g., until it is determined that battery pack is balanced).

It will be appreciated that 702-712 can be repeated in whole or in part or may be performed in a different order than shown in FIG. 7.

The inventors of this application have noted that by applying very short charging pulses to the battery pack when a state of charge (SoC) of the battery pack is in a particular range, the battery cells tend to balance i.e., the charge capacity, impedance, SoC, and/or voltage levels of the battery cells tend to converge and become similar to each other over a period of time. Additionally, it is also noted, that the application of very short charging pulses work towards balancing of battery cells for a particular range of SOC values of the battery pack, wherein the particular range of the SoC values of the battery pack depend upon various parameters such as, but not limited to, type of the battery, construction and/or form factory of the battery (battery cells or battery pack), age of the battery, health of the battery, environmental conditions where the battery is employed such as temperature, pressure, etc.

Some of the Li-ion battery packs (including jelly roll pouch cells) were tested and the balancing-optimized pulse charging protocol performed optimally when the SoC of the pack was in the range of 30%-40% SoC. In other words, application of very short charging pulses to such battery pack having SoC in the range of 30%-40% SoC, showed the battery cells becoming balanced over a period of time.

It will be appreciated that the modules, processes, systems, and sections described above can be implemented in hardware, hardware programmed by software, software instructions stored on a non-transitory computer readable medium or a combination of the above. A system and/or a module (e.g., controller, BPID module, CPS module, measurement module etc.) as described above, for example, can include a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a non-transitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for event updates management and control.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
employing a first charging protocol to charge a battery pack that comprises a plurality of battery cells;
while the battery pack is being charged, determining, based on at least one battery cell parameter of one or more battery cells of the battery pack, that the battery pack is imbalanced;
after determining that the battery pack is imbalanced, determining a value of a state of charge (SoC) of the battery pack;
determining whether the value of the SoC of the battery pack corresponds to a particular range of values; and
in response to determining that the value of the SoC of the battery pack corresponds to the particular range of values and that the battery pack is imbalanced, employing a second charging protocol to charge the battery pack,
wherein the first charging protocol is different from the second charging protocol.

2. The method of claim 1, wherein employing the first charging protocol comprises employing a CC-CV charging protocol, a pulse charging protocol, a constant current protocol, a constant voltage protocol, a modulated pulse charging protocol, or a combination thereof.

3. The method of claim 1, wherein employing the second charging protocol comprises applying charging pulses substantially simultaneously to at least two or more battery cells connected in series in the battery pack.

4. The method of claim 1, further comprising:
in response to determining that the value of the SoC of the battery pack does not correspond to the particular range of values, continuing charging the battery pack by employing the first charging protocol until the value of the SoC of the battery pack corresponds to the particular range of values or until the battery pack is fully charged.

5. The method of claim 1, wherein determining that the battery pack is imbalanced comprises determining a respective value of the at least one battery cell parameter of the one or more battery cells, and wherein the at least one battery cell parameter comprises one or more of: a cell voltage, a cell energy, a cell temperature, and a cell state of charge (SoC).

6. The method of claim 5, wherein determining that the battery pack is imbalanced further comprises determining that the value of the at least one battery cell parameter of at least one battery cell of the battery pack is less than a particular threshold value.

7. The method of claim 5, wherein determining that the battery pack is imbalanced further comprises determining that a difference between the highest value of the at least one battery cell parameter and the lowest value of the at least one battery cell parameter, among the values of at the least one battery cell parameter for the one or more battery cells, is more than a particular threshold value.

8. The method of claim 1, wherein:
employing the first charging protocol comprises charging the battery pack by applying first charging pulses to at least some battery cells of the battery pack,
employing the second charging protocol comprises charging the battery pack by applying second charging pulses to the at least some battery cells of the battery pack, and
the second charging pulses have an ON period duration that is shorter than an ON period duration of the first charging pulses.

9. The method of claim 8, wherein the ON period duration of the first charging pulses and the ON period duration of the second charging pulses are based on a rate of change of a charging current through the battery pack.

10. A battery pack, comprising:
a plurality of battery cells; and
a controller, operatively coupled to the plurality of battery cells, wherein the controller is configured to perform or control performance of operations that comprise:
employ a first charging protocol to charge the battery pack;
while the battery pack is being charged, determine, based on at least one battery cell parameter of one or more battery cells of the battery pack, that the battery pack is imbalanced;
after determining that the battery pack is imbalanced, determine a value of a state of charge (SoC) of the battery pack;
determine whether the value of the SoC of the battery pack corresponds to a particular range of values; and
in response to a determination that the value of the SoC of the battery pack corresponds to the particular range of values and that the battery pack is imbalanced, employ a second charging protocol to charge the battery pack,
wherein the first charging protocol is different from the second charging protocol.

11. The battery pack of claim 10, wherein:
the operation to employ the first charging protocol comprises an operation to charge the battery pack by application of first charging pulses to at least some battery cells of the battery pack,
the operation to employ the second charging protocol comprises an operation to charge the battery pack by application of second charging pulses to the at least some battery cells of the battery pack, and
the second charging pulses have an ON period duration that is shorter than an ON period duration of the first charging pulses.

12. The battery pack of claim 11, wherein the ON period duration of the first charging pulses and the ON period duration of the second charging pulses are based on a rate of change of a charging current through the battery pack.

13. The battery pack of claim 10, wherein the operations further comprise:
in response to a determination that the value of the SoC of the battery pack does not correspond to the particular range of values, continue charging the battery pack by employing the first charging protocol until a determination is made that the value of the SoC of the battery pack corresponds to the particular range of values or until the battery pack is fully charged.

14. The battery pack of claim 10, wherein an operation to employ the second charging protocol comprises an operation to apply charging pulses substantially simultaneously to at least two or more battery cells connected in series in the battery pack.

15. A charging device, comprising:
at least one processor; and
a non-transitory computer readable storage medium, operatively coupled to the at least one processor, configured to store instructions, wherein the instructions, in response to execution by the at least one processor, cause the at least one processor to perform or control performance of operations that comprise:
employ a first charging protocol to charge a battery pack that comprises a plurality of battery cells;
while the battery pack is being charged, determine, based on at least one battery cell parameter of one or more cells of the battery pack, that the battery pack is imbalanced;
after determining that the battery pack is imbalanced, determine a value of a state of charge (SoC) of the battery pack;
determine whether the value of the SoC of the battery pack corresponds to a particular range of values; and
in response to a determination that the value of the SoC of the battery pack corresponds to the particular range of values and that the battery pack is imbalanced, employ a second charging protocol to charge the battery pack,
wherein the second charging protocol is different from the first charging protocol.

16. The charging device of claim 15, wherein:
the operation to employ the first charging protocol comprises an operation to charge the battery pack by application of first charging pulses to at least some battery cells of the battery pack,
the operation to employ the second charging protocol comprises an operation to charge the battery pack by application of second charging pulses to the at least some battery cells of the battery pack, and
the second charging pulses have an ON period duration that is shorter than an ON period duration of the first charging pulses.

17. The charging device of claim 16, wherein the ON period duration of the first charging pulses and the ON period duration of the second charging pulses are based on a rate of change of a charging current through the battery pack.

18. The charging device of claim 15, wherein the operations further comprise:
in response to a determination that the value of the SoC of the battery pack does not correspond to the particular range of values, continue charging the battery pack by employing the first charging protocol until a determination is made that the value of the SoC of the battery pack corresponds to the particular range of values or until the battery pack is fully charged.

19. The charging device of claim 15, wherein an operation to employ the second charging protocol comprises an operation to apply charging pulses substantially simultaneously to at least two or more battery cells connected in series in the battery pack.

* * * * *